(12) United States Patent
Monaco et al.

(10) Patent No.: US 7,568,108 B2
(45) Date of Patent: *Jul. 28, 2009

(54) ACCESS AND SECURITY CONTROL SYSTEM AND METHOD

(75) Inventors: Marc Monaco, Sewell, NJ (US); Paul A. Roberts, Collingswood, NJ (US); Thomas J. Clare, Media, PA (US)

(73) Assignee: Sielox, LLC, Runnemede, NJ (US)

( * ) Notice: Subject to any disclaimer, the term of this patent is extended or adjusted under 35 U.S.C. 154(b) by 785 days.

This patent is subject to a terminal disclaimer.

(21) Appl. No.: 11/068,142

(22) Filed: Feb. 28, 2005

(65) Prior Publication Data

US 2006/0080541 A1 Apr. 13, 2006

Related U.S. Application Data

(63) Continuation-in-part of application No. 10/948,901, filed on Sep. 24, 2004, now Pat. No. 7,280,030.

(51) Int. Cl.
*G06F 21/00* (2006.01)
(52) U.S. Cl. .................. 713/182; 726/1; 726/2
(58) Field of Classification Search ............... None
See application file for complete search history.

(56) References Cited

U.S. PATENT DOCUMENTS 6,720,874 B2 * 4/2004 Fufido et al. ............ 340/541
7,010,691 B2 * 3/2006 Wheeler et al. .......... 713/170

* cited by examiner

*Primary Examiner*—Pramila Parthasarathy
(74) *Attorney, Agent, or Firm*—Caesar, Rivise, Bernstein, Cohen & Pokotilow, Ltd.

(57) ABSTRACT

A system and method for automatically regulating access control levels in an access control system based on prevailing security levels including homeland security levels, local environment situations such as crowds, rioting, looting, severe weather and temporal states such as workdays, weekends, holidays, and open houses.

41 Claims, 12 Drawing Sheets

PREVAILING SECURITY SITUATION #1: NORMAL DAY

| PERSONNEL | LOCATION OR DEVICE ||||| TIME |
|---|---|---|---|---|---|---|
| | Portals or Sectors | Telephone/ Facsimile | Computer/ Network | Lights | Other | |
| Corporate | ALL | ALL | ALL | ALL | | ALL |
| Legal Dept. | ALL | ALL | ALL | ALL | | ALL |
| Engineering | Portals 1-50 | T1-T105 | PC1-PC105 | L1-L105 | | 6AM-11PM |
| Systems | Portals 1-50 | T1-T105 | PC1-PC105 | L1-L105 | | 6AM-11PM |
| Structures | Portals 1-50 | T1-T105 | PC1-PC105 | L1-L105 | | 6AM-11PM |
| Avionics | Portals 1-50 | T1-T105 | PC1-PC105 | L1-L105 | | 6AM-11PM |
| Propulsion | Portals 1-50 | T1-T105 | PC1-PC105 | L1-L105 | | 6AM-11PM |
| Quality Assurance | Portals 1-25 | T1-T20 | PC200-PC250 | L1-L20 | | 6AM-11PM |
| Billing | | | | | | 9AM-6PM |
| Maintenance | All maintenance portals | T230-T250 | PC500-PC510 | L230-L250 | | 6AM-11PM |
| Security | ALL | ALL | PC300-PC350 | ALL | | ALL |

FIG. 7A

PREVAILING SECURITY SITUATION #10: OPEN HOUSE

| PERSONNEL | LOCATION OR DEVICE | | | | | TIME |
|---|---|---|---|---|---|---|
| | Portals or Sectors | Telephone/ Facsimile | Computer/ Network | Lights | Other | |
| Corporate | Exit Portals 1-3 | Emergency Phones (EP) | NONE | Halls(H) 1-10 | | 10AM-3PM |
| Legal Dept. | Exit Portals 1-3 | Emergency Phones | NONE | Halls(H) 1-10 | | 10AM-3PM |
| Engineering | Exit Portals 1-3 | Emergency Phones | NONE | Halls(H) 1-10 | | 10AM-3PM |
| Systems | Exit Portals 1-3 | EP | NONE | H1-H10 | | 10AM-3PM |
| Structures | Exit Portals 1-3 | Emergency Phones | NONE | Halls(H) 1-10 | | 10AM-3PM |
| Avionics | Exit Portals 1-3 | Emergency Phones | NONE | Halls(H) 1-10 | | 10AM-3PM |
| Propulsion | Exit Portals 1-3 | Emergency Phones | NONE | H1-H10 | | 10AM-3PM |
| Quality Assurance | Exit Portals 1-3 | Emergency Phones | NONE | Halls(H) 1-10 | | 10AM-3PM |
| Billing | Exit Portals 1-3 | EP | NONE | H1-H10 | | 10AM-3PM |
| Maintenance | Exit Portals 1-3 | Emergency Phones | NONE | Halls(H) 1-10 | | 10AM-3PM |
| Security | Exit Portals 1-3 | ALL | PC300-PC350 | H1-H10 | | ALL |

FIG. 7B

PREVAILING SECURITY SITUATION #100: ON-GOING THEFT

| PERSONNEL | LOCATION OR DEVICE | | | | | TIME |
|---|---|---|---|---|---|---|
| | Portals or Sectors | Telephone/ Facsimile | Computer/ Network | Lights | Other | |
| Corporate | NONE | Emergency Phones (EP) | NONE | ALL | | ALL |
| Legal Dept. | NONE | EP | NONE | ALL | | ALL |
| Engineering | NONE | Emergency Phones (EP) | NONE | ALL | | 6AM-11PM |
| Systems | NONE | EP | NONE | ALL | | 6AM-11PM |
| Structures | NONE | Emergency Phones (EP) | NONE | ALL | | 6AM-11PM |
| Avionics | NONE | Emergency Phones (EP) | NONE | ALL | | 6AM-11PM |
| Propulsion | NONE | Emergency Phones (EP) | NONE | ALL | | 6AM-11PM |
| Quality Assurance | NONE | Emergency Phones (EP) | NONE | ALL | | 6AM-11PM |
| Billing | NONE | EP | NONE | ALL | | 9AM-6PM |
| Maintenance | NONE | Emergency Phones (EP) | NONE | ALL | | 6AM-11PM |
| Security | ALL | ALL | ALL | ALL | | ALL |

FIG. 7C

| Employee X Access Rights ||
|---|---|
| PSS# | ACCESS RIGHT LEVEL |
| 1 | 1 |
| 2 | 2 |
| 3 | 5 |
| 4 | 8 |
| 5 | 10 |

Fig. 8A

| Cleaning Staff Department ||
|---|---|
| PSS# | ACCESS RIGHT LEVEL |
| 1 | 1 |
| 2 | 3 |
| 3 | 8 |
| 4 | 10 |
| 5 | 10 |

Fig. 8B

| ACCESS RIGHT LEVEL | LOCATION OR DEVICE | | |
|---|---|---|---|
| | Portals or Sectors | Telephone/ Facsimile | Computer/ Network |
| 1 | ALL | ALL | ALL |
| 2 | Portals 1-50 | T1-T105 | PC1-PC105 |
| 3 | Portals 1-40 | T1-95 | PC1-PC |
| 4 | Portals 1-35 | T1-80 | PC1-PC |
| 5 | Portals 1-25 | T1-T75 | NONE |
| 6 | Portals 1-18 | T1-T40 | NONE |
| 7 | Portals 1-14 | T1-T30 | NONE |
| 8 | Portals 1-5 | T1-T20 | NONE |
| 9 | Emergency Exits | Emergency Phones | NONE |
| 10 | NONE | NONE | NONE |

Fig. 8C

ACCESS AND SECURITY CONTROL SYSTEM AND METHOD

RELATED APPLICATIONS

This application is a Continuation-in-Part application of, and claims the benefit under 35 U.S.C. §120 of, application Ser. No. 10/948,901 filed on Sep. 24, 2004 entitled SYSTEM AND METHOD FOR ADJUSTING ACCESS CONTROL BASED ON HOMELAND SECURITY LEVELS, and whose entire disclosure is incorporated by reference herein.

BACKGROUND OF THE INVENTION

1. Field of Invention

This invention relates to generally to access control systems and, more particularly, to a system and method for manually or automatically controlling access in various degrees for a range real property and its equipment, including computer-based properties.

2. Description of Related Art

Due to concerns of terrorist attacks and infiltration of buildings and other facilities in recent years, the need for added security has become imperative. Organizations have enhanced security resources by various measures such as re-training existing security personnel, hiring additional security personnel or just hiring security personnel in the first instance where none existed before. Such efforts even include instructing the overall workforce to be alert, aware and knowledgeable about reacting in emergency situations should terrorist acts occur.

In addition, to better alert the public in general, the federal government, via the Department of Homeland Security, has devised the Homeland Security Advisory System that comprises distinct alert levels (also referred to as "threat levels") that are issued from time to time. These levels are the following:

1) Green—Low Risk: low risk of terrorist attacks
2) Blue—Guarded Risk: general risk of terrorist attacks
3) Yellow—Elevated Risk: significant risk of terrorist attacks
4) Orange—High Risk: high risk of terrorist attacks
5) Red—Severe Risk: severe risk of terrorist attacks These levels can be modified by state and local governments to adapt the national alert levels to local existing situations or concerns.

Typically, a security system involves having each person in a group having a set of privileges and a time when each of those privileges can be asserted. This is known as a security protocol. Often these security systems also have a "lock-down" mode where nearly all access is denied to substantially all people; alternatively, the other operative mode is "normal" mode here mostly no access is restricted. These two settings are generally known as "lock-down" mode and "normal" mode. Because of the increased risk to individuals, businesses and governments as a result of various socio-economic developments, it has been observed by Applicants that this "all or none" system cannot provide adequate protection in all instances.

One solution is disclosed in U.S. application Ser. No. 10/948,901 filed on Sep. 24, 2004 entitled SYSTEM AND METHOD FOR ADJUSTING ACCESS CONTROL BASED ON HOMELAND SECURITY LEVELS which is directed to an access control system (ACS) that adjusts ACS operation as the Homeland Security Levels are issued, such as restricting access of building/facility portals (e.g., doors, garages, walkways, windows, etc.), times of passage through these portals, computer access in the building/facility, etc.

However, there remains a need for system and method that protects individual residences, businesses, government facilities, etc., in response to a variety of circumstances in various degrees. The present invention is an improvement on U.S. application Ser. No. 10/948,901 and provides such a solution.

All references cited herein are incorporated herein by reference in their entireties.

BRIEF SUMMARY OF THE INVENTION

A method for adjusting access in an access control system for a building or facility or a residence, having portals (e.g., doors, garages, walkways, windows, etc.) and equipment (e.g., telephones, facsimile machines, lighting, computers, computer networks, etc.), based on prevailing security situations (e.g., Homeland Security Levels, on-going theft or break-in, rioting, bomb threats, press releases, pillaging, fire, weather, earthquake, visitors-on-premises, holidays, etc.). The method comprises the steps of: associating personnel and time criteria with portals and equipment for every prevailing security situation to form a portal access and equipment control matrix; storing the portal access and equipment control matrix in a database of an access control system computer; coupling the access control system computer to portal controls and equipment controls; selecting one of the prevailing security situations from the portal access and equipment control matrix; and automatically adjusting portal controls and equipment controls for the selected prevailing security situation.

A system for controlling access to a building or facility having portals (e.g., doors, garages, walkways, windows, etc.) that are opened or closed by locks, and equipment (e.g., telephones, facsimile machines, lighting, computers, computer networks, etc.) in the building or facility, using identity data detected by identity information detection means (e.g., access card readers, keypads, touch screens, biometric devices such as fingerprint readers, eye-scan (e.g., retina scan) detectors, voice recognition detectors, etc.) based on prevailing security situations (e.g., Homeland Security Levels, on-going theft or break-in, rioting, bomb threats, press releases, pillaging, fire, weather, earthquake, visitors-on-premises, holidays, etc.). The system comprises an access system control computer interfaced with the identity information detection means and with locks on the portals and with the equipment and wherein access through the portals or operation of the equipment is modified by the access system control computer based on a portal access and equipment control matrix that associates personnel, time and location criteria with the prevailing security situations.

BRIEF DESCRIPTION OF SEVERAL VIEWS OF THE DRAWINGS

The invention will be described in conjunction with the following drawings in which like reference numerals designate like elements and wherein:

FIG. 7A is an exemplary portal access and equipment control (PA/EC) matrix for a prevailing security situation: normal day at an aerospace facility by way of example;

FIG. 7B is an exemplary PA/EC matrix for a prevailing security situation: open house at an aerospace facility;

FIG. 7C is an exemplary PA/EC matrix for a prevailing security situation: on-going theft at an aerospace facility;

FIG. 8A is a table of access rights attributed to individuals in the access and security control system;

FIG. 8B is a table of access rights attributed to groups in the access and security control system; and FIG. 8C is a table defining the access rights with regard to portals and equipment in the access and security control system.

DETAILED DESCRIPTION OF THE INVENTION

Figure 1:
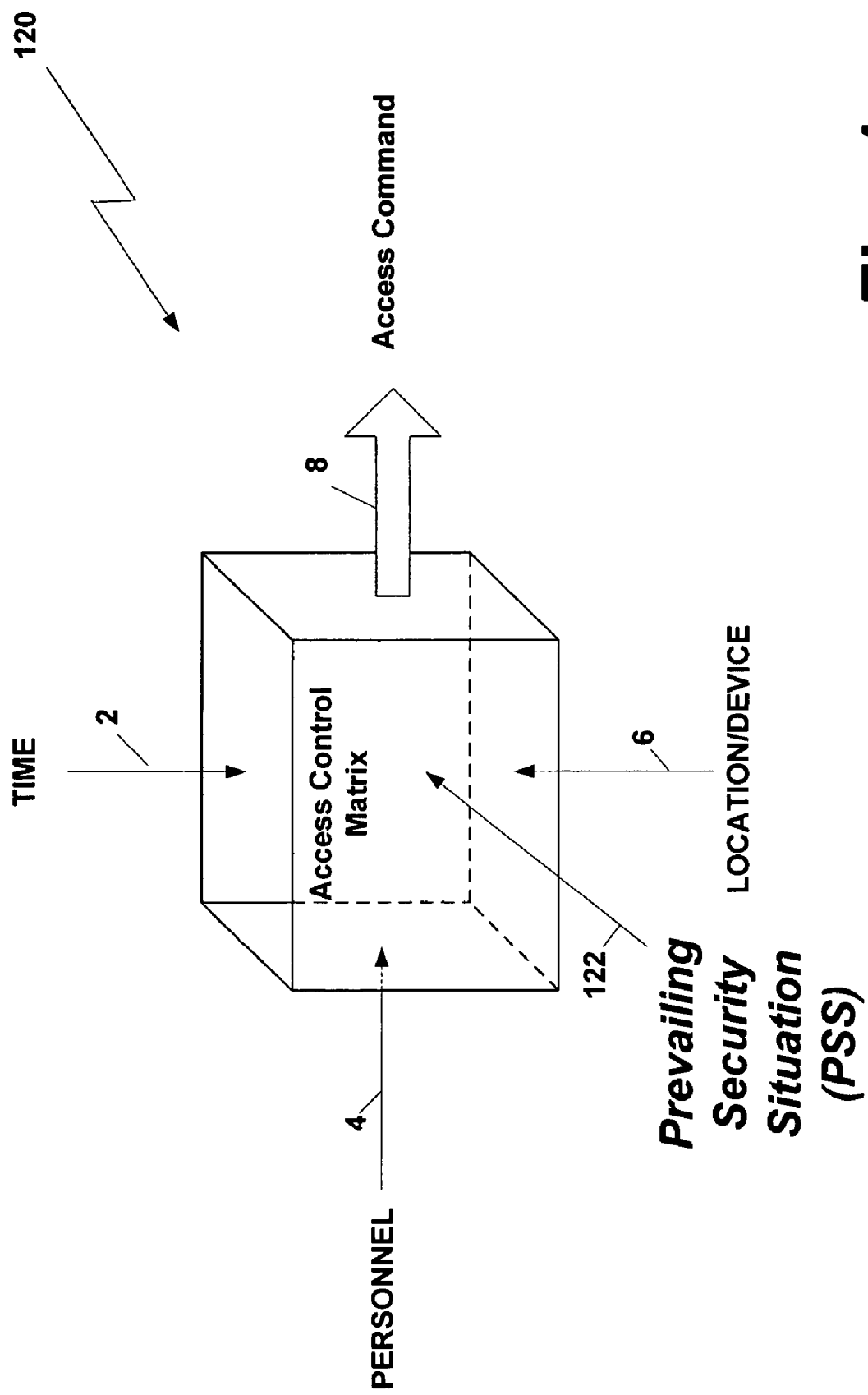
FIG. 1 is a functional diagram of the method of the access and security control system of the present invention.

FIG. 1 depicts an overview of the method 120 of the present invention. In particular, conventional access control systems utilize an access control matrix whereby an access command 8, i.e., access granted or access denied, is determined based on three basic criteria: time 2, personnel 4 and location/devices 6. In other words, whether a person, or people, can gain access to a certain location or locations or device(s), at a certain time or times, is established in a matrix that relates all three of these criteria. For example, employee X in quality control (personnel criteria) is permitted access to production assembly lines alpha-gamma (location criteria) during normal working hours (8am-5pm). What the method of the present invention 120 does is to add another criteria dimension to the access control matrix: prevailing security situation (PSS) 122. In the method of the present invention 120, the access control matrix now includes an environment condition or conditions referred to hereinafter as the PSS 122: The PSS 122 includes such conditions as, but are not limited in any way to the following enumerated conditions: Homeland Security Levels (national, regional and local levels), presence of visitors in building or facility, on-going theft or break-in is detected, rioting in the vicinity, bomb threats, press release, pillaging, fire, weather events, earthquakes, and any other events where lives and property could be in jeopardy, and further including open-house to the public, holidays, weekends and workdays. As a result, an access control system utilizing this added PSS dimension 122 can be used in government or public facilities, private businesses, home residences, prisons, etc. Furthermore, the present invention, as will be discussed in detail later, is an improvement to the system and method disclosed in application Ser. No. 10/948,901 because the invention of that application is directed to the particular PSS criteria of Homeland Security Levels whereas the present invention includes a wide variety of PSS criteria including Homeland Security Levels.

As will be discussed in detail later, the access command 8 from the present invention 120 controls access to locations, as well as the operation of devices (also referred to as "equipment"). It should be understood that the term "location/device" as used throughout this Specification with regard to the present invention 120/220 is meant to convey the "what" that is being controlled. Thus, as will be discussed later, any type of portal, or computer, or network, or lighting or telephone or facsimile, lockers, even vehicles, etc. is covered under the terms "location/device/equipment." Thus, a building or house can be subdivided into rooms or sectors or any other term used to designate portions of the building or house and are included in the term "location." With regard to "devices or equipment," these terms are used in its broadest sense and includes such things, but is not limited in any way, as computers, networks, lighting, telephones, facsimile machines, portals, etc. The important point is that whatever is being controlled by the present invention 120/220, is not limited, in any way, to that which is actually enumerated.

With regard to personnel 4, what is meant are the identification of individuals (e.g., employee X, resident X, etc.) or groups of individuals (e.g., flight control department personnel, family Y members, etc.), or access rights attributed to the individual or to the group of individuals, as will be discussed in detail later.

Figure 1A:
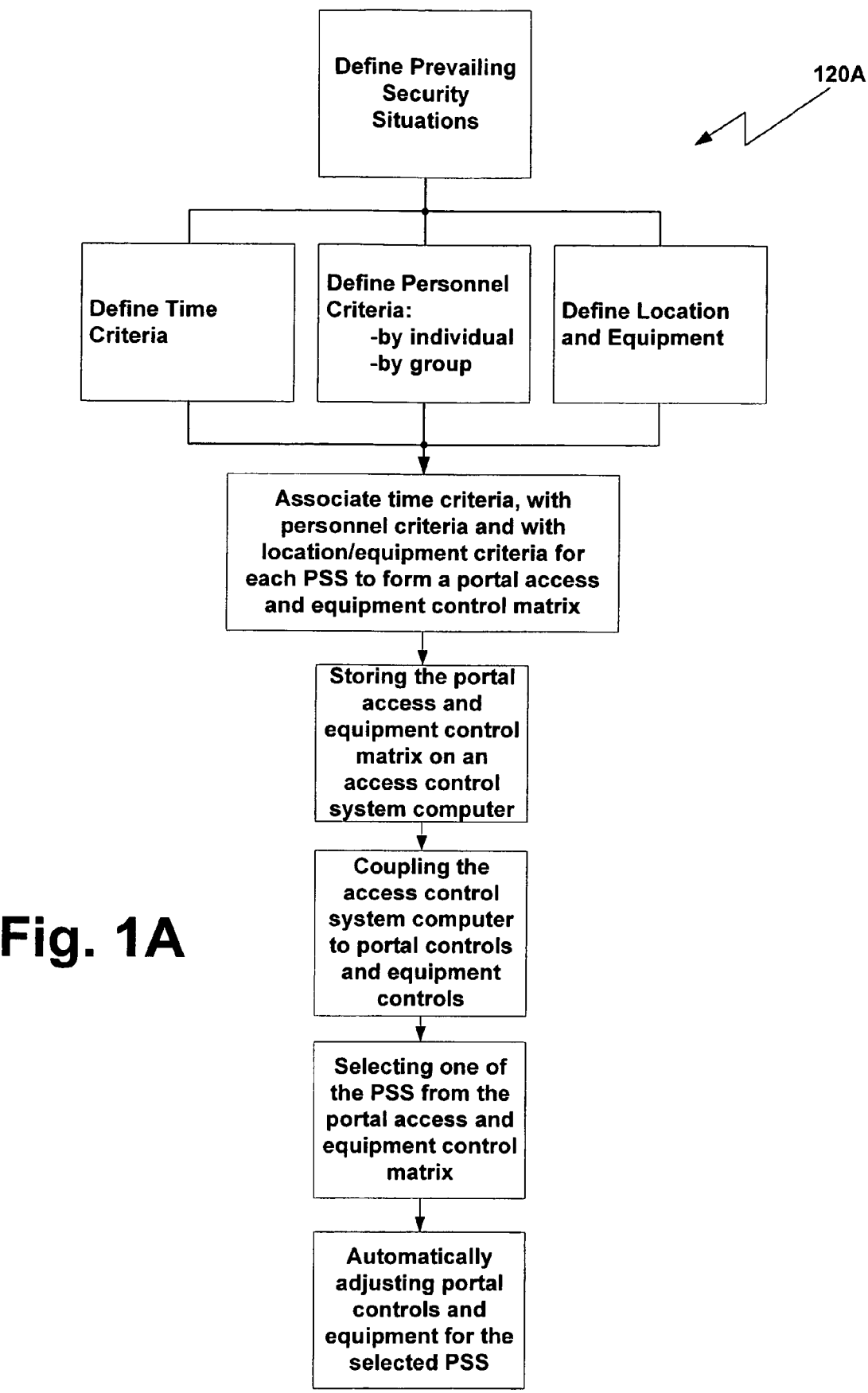
FIG. 1A is a flow diagram of the method of the present invention.

FIG. 1A depicts the flow diagram 120A of the method 120. Each PSS 122 is defined initially. Next, the time criteria 2, the personnel criteria 4 and the location/equipment criteria 6 are defined. Once these are defined, the criteria are then associated to form the access control matrix, hereinafter referred to as a portal access and equipment control (PA/EC) matrix which is then stored in an access control system computer. The computer is then coupled to portal controls and equipment controls. Depending on the national or local environment, the access control system computer then selects the corresponding PSS 122 and then implements the appropriate portal controls and equipment controls for the selected PSS 122.

As in application Ser. No. 10/948,901, and by way of example only, the preferred embodiment utilizes an already-existing access control system which is sold under the tradename Pinnacle™ by the Assignee of the present application, namely, Checkpoint Systems, Inc. of Thorofare, N.J. However, it should be understood that the present invention is adaptable to any access control system and that any subsequent discussion of the Pinnacle™ access control system does not, in any way, limit the present invention to only that access control system. Furthermore, it should be understood that the present invention is adaptable for a variety of settings, such as but not limited to, government agencies/facilities, businesses and private residences. Thus, not every feature or aspect of the present invention is necessarily used in a particular setting; but it is within the broadest scope of this invention that the provision for each feature or aspect is available.

As disclosed in application Ser. No. 10/948,901, the ASCS (access and security control system) 220 of the present invention 120 permits the adjustment of access control levels in an access system based on Homeland Security Levels (HSLs). The system 220 of the present invention 120, as will be discussed below, also permits the adjustment of access control levels based on HSLs but in addition, the system 220 also controls the operation of other equipment such as telephones, facsimile machines, lighting, etc. Furthermore, the system 220 permits authorized personnel the ability to control physical and computer access and as well as the use of equipment (e.g., telephones, fax machines, printers, etc.) whenever the prevailing security situation (PSS) 122 occurs such as, but not limited to: presence of visitors in building or facility, ongoing theft or break-in is detected, rioting in the vicinity, bomb threats, press release, pillaging, fire, weather events, earthquakes, and any other events where lives and property could be in jeopardy. As a result, the system 220 of the present invention can be installed in government or public facilities, private businesses, home residences, prisons, etc.

Figure 2:
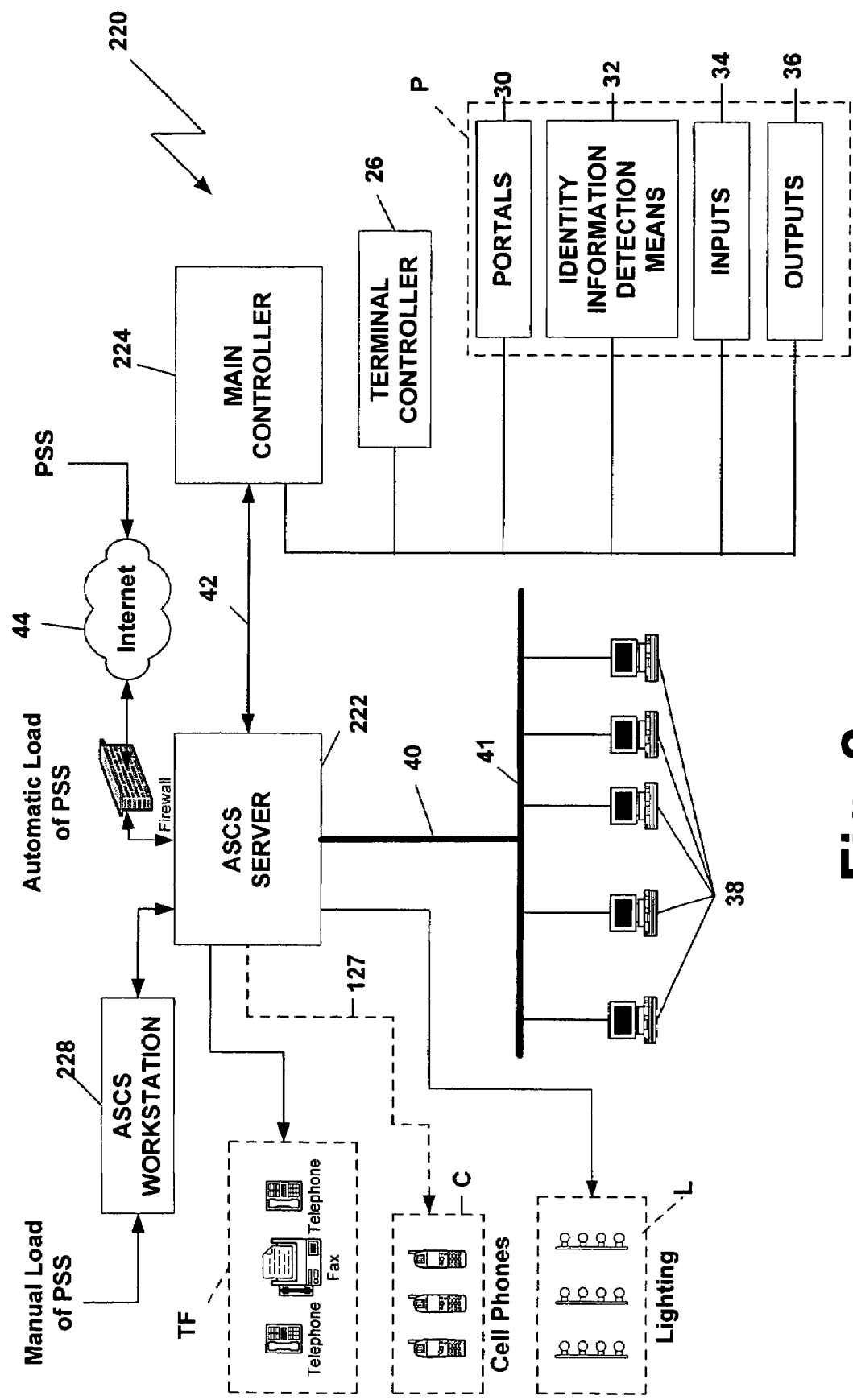
FIG. 2 is a block diagram of an access and security control system that adjusts access to portals, computers, and the operation of telephones, facsimile machines and lighting based on the prevailing security situation (PSS)

In view of the foregoing, FIG. 2 depicts a block diagram of the system 220 of the present invention. The ASCS 220 comprises an ASCS server 222, a main controller 224, and a ASCS workstation 228. As disclosed in application Ser. No. 10/948,901, these components operate together to control access to portals 30 (doors, garages, walkways, windows, escalators, lockers, etc.) based on data from identity information detection means 32 and inputs 34. The identify information detection means 32 may include access card readers, keypads, display screens (including touch screens), biometric devices such as fingerprint reader, eye-scan (e.g., retina scan) detector, voice recognition detector, etc., and includes any device known in the art that permits a person (attempting to gain access through a portal 30) the ability to provide identity information to the ASCS 220. The inputs 34 basically comprise switches that the terminal controller 26 monitors to determine if the portal 30 (e.g., door) is open or closed. The outputs 36 comprise drivers for changing the state of the inputs 34, as determined by the terminal controller 26; the outputs 36 also include motorized bars 129 (FIG. 5) for securing windows, and motors for controlling operation of escalators, elevators and locks for access to lockers. The portals 30, identification information detection means 32, inputs 34 and outputs 36 will be generally referred to by the reference letter P throughout this Specification to refer to the mechanisms/devices of the ASCS 220 that controls physical access to a location.

The ASCS 220 also controls equipment/device operation as follows:

The ASCS 220 controls computer access to the network 41 and the networked computers 38 themselves. This also includes controlling access to information and files on the computers 38. The ASCS server 222 and ASCS workstation 28 and the computers 38 communicate over a LAN or WAN 40. The ASCS server 22 and the main controller 24 communicate used a twisted pair harness 42.

The ASCS 220 controls use of telephones and facsimile machines, individually or in groups, as will be discussed in detail later. The reference character T-F refers throughout this Specification to the telephones or facsimiles individually or as groups.

The ASCS 220 controls operation of lighting to rooms or areas, individually or in groups, as will be discussed in detail later. The reference character L refers throughout this Specification to the lighting, individually or as groups.

The ASCS 220 controls operation of a transmitter 225 (see FIG. 2) that broadcasts a signal to cellular telephones (or other transceivers, such as two-way radio communication units, or pagers, or text devices) on the person of security personnel to alert them to a security or other emergency situation. The reference character C refers throughout this Specification to any type of wireless transmission 127 to security personnel.

Figure 3:
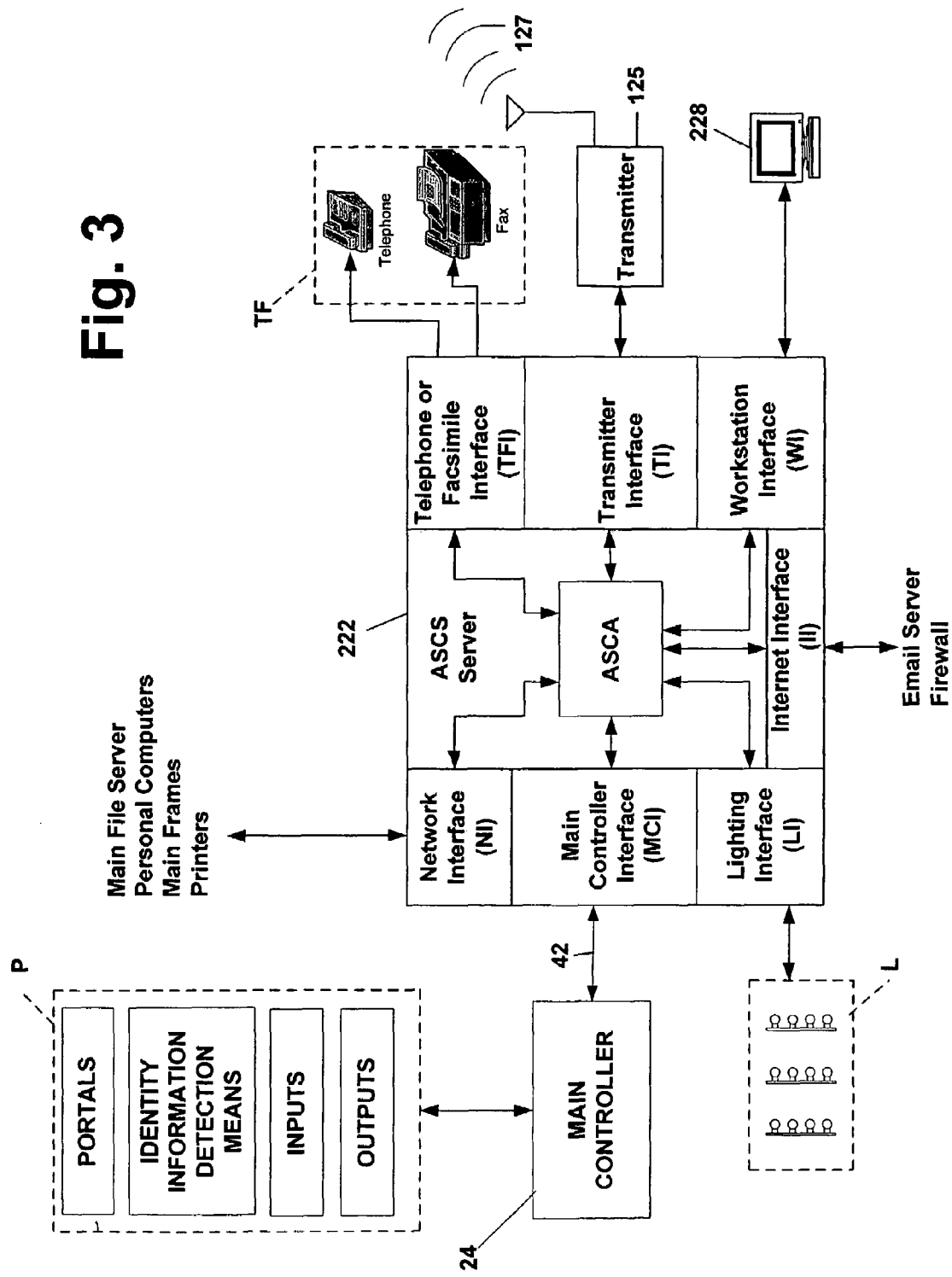
FIG. 3 is a block diagram of the access and security control server (ASCS) and its interfaces, forming a part of the present invention.

As shown in FIG. 3, the server 222 comprises a computer running an access and security control application (ASCA) and associated database software used to configure the main controller 224 and terminal controller 26 and to display event information as reported by these controllers for communicating with and controlling the physical access devices P, in accordance with application Ser. No. 10/948,901. In particular, the ASCA comprises the PA/EC matrix and communicates with the physical access devices P through a main controller interface (MCI) in the server 222 for controlling access using each of the components of the physical access devices P. The server 222 also comprises a network interface (NI) through which the ASCA controls access to the network 41 and the PCs 38. The server 222 also comprises a telephone-facsimile interface (TFI) through which the ASCA enables/disables particular telephones/facsimile machines based on the security criteria, as will be discussed below. The server 222 also comprises a lighting interface (LI) through which the ASCA enables lighting based on the security criteria. The server 222 also comprises a transmitter interface (TI) for activating the transmitter 125 to broadcast to all security personnel via their individual cell phones (or other transceivers or pagers, or text devices) and thereby alert them to take appropriate action or measures. The server 222 also comprises a workstation interface (WI) for communicating with the ASCS workstation 228.

The ASCS workstation 228 may comprise a PC that runs a graphical user interface (GUI). The main controller 224 is a data multiplexer (e.g., such as an AC-901 16-bit main controller with connectors, part number 946782) and which provides processing capabilities, including buffering events and linking inputs 34 to outputs 36. The terminal controller 26, (e.g., such as an AC-601 16-bit terminal controller with connectors, part number 328812) is an intelligent autonomous device that makes the decisions to grant/deny access, and in particular, receives configuration information (e.g., cards to be granted access during specified periods), decides whether to grant or deny access, and subsequently reports activity back to the server 222, via the main controller 224. In particular, the portals 30 monitor/control the status of the portal (lock/unlock). The readers 32 are input devices that interpret the credentials of the person requesting access. The inputs 34 monitor the state of a switch whereas the outputs 36 control the state of a switch.

Once a PSS 122 is selected, should a user then interface with the identity information detection means 32 (e.g., swipe his/her card through an access card reader, enter data through a keypad/touch screen, or conduct a retina scan, place his/her finger on a fingerprint scanner, sample the person's voice, etc.) this identity information (e.g., name, badge number, PIN (personal identification number or any known equivalent), retina information, voice data, fingerprint data, etc.) is compared against the particular personnel criteria for the particular PA/EC matrix. If the identity data is available among those criteria, access is permitted and the terminal controller 26 commands the drivers for the portal 30 or other output 36 to permit (e.g., open lock) the user access. If, on the other hand, that identity data is not available among those criteria, access is denied.

It should be understood that depending on the type of identity information detection means 32 being used (e.g., access card reader, keypads, proximity readers, display screens (including touch screens), fingerprint scanner, retina scan, voice recognition, etc.) the corresponding identity data (if authorized for that PSS 122 in the PA/EC matrix) in the personnel criteria are in a form compatible with the particular identity information detection means 32 that has forwarded the particular identity data to the ASCA. For example, if a fingerprint scanner is used as an identity information detection means 32, then individuals who are permitted access, depending on the personnel criteria for the PA/EC matrix, have corresponding fingerprint data against which to compare the incoming fingerprint data from the fingerprint scanner.

Furthermore, it should be understood that it is within the broadest scope of the present invention 120/220 to include different kinds of identity information detection means 32 that are coupled to the system 220 Thus, the system 220 may include fingerprint scanners, access card readers, voice recognition detectors, etc. or any combination thereof.

When the PSS 122 changes, the ASCA provides a preview of the pending changes and enables the administrator to selectively confirm or deny each one. Modifications that result from changing the PSS 122 are sent to the controllers 24 and 26 automatically, without the need for a manual scheduled refresh. Changes to the PSS 122 are logged in an event archive.

The ASCA requires a login from a user in an administrators role. All others are not permitted to run the ASCA. Only one instance of the ASCA runs on a single PC.

The PSS 122 can be manually inputted to the ASCS through the ASCS workstation 228, as shown in FIG. 2. Alternatively, as also shown in FIG. 2, the ASCA may comprise an update module that periodically looks on the Internet 44 to determine if any environment condition in the vicinity has developed requiring a change in the access conditions. This includes, among other things, periodically local police or other emergency calls, news reports, press releases, checking the Department of Homeland Security website, or even the pertinent state website, (e.g., Pennsylvania, by way of example only) for obtaining the current HSL (either or both national and local levels) so that the most current PSS 122 can be acted upon by the ASCA.

Figure 4:
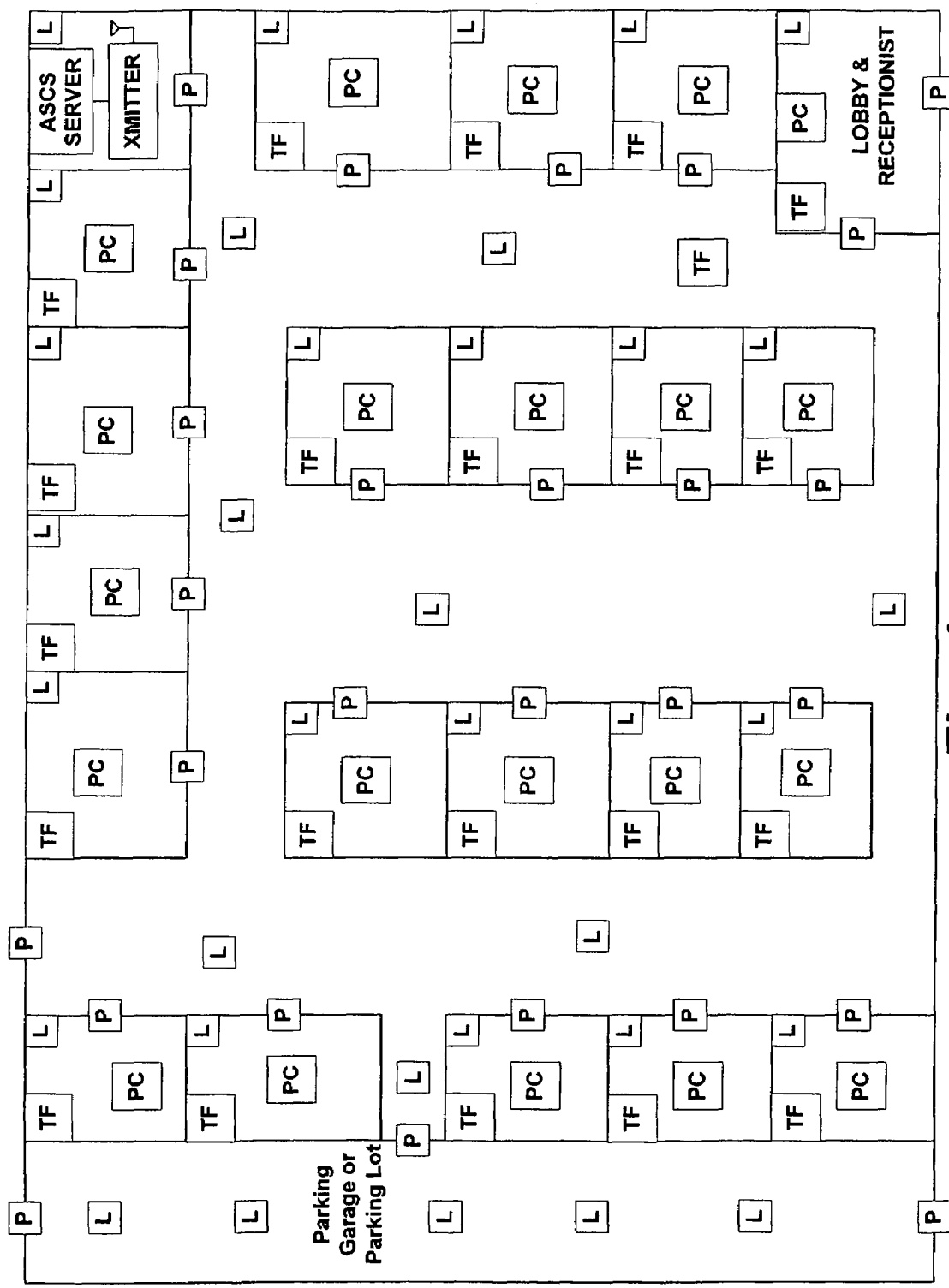
FIG. 4 is a plan view of the floor of a home, facility or business that utilizes the present invention whereby access to, or operation of, portals, lighting, telephones, facsimile machines, personal computers are all controlled by the ASCS.
Figure 5:
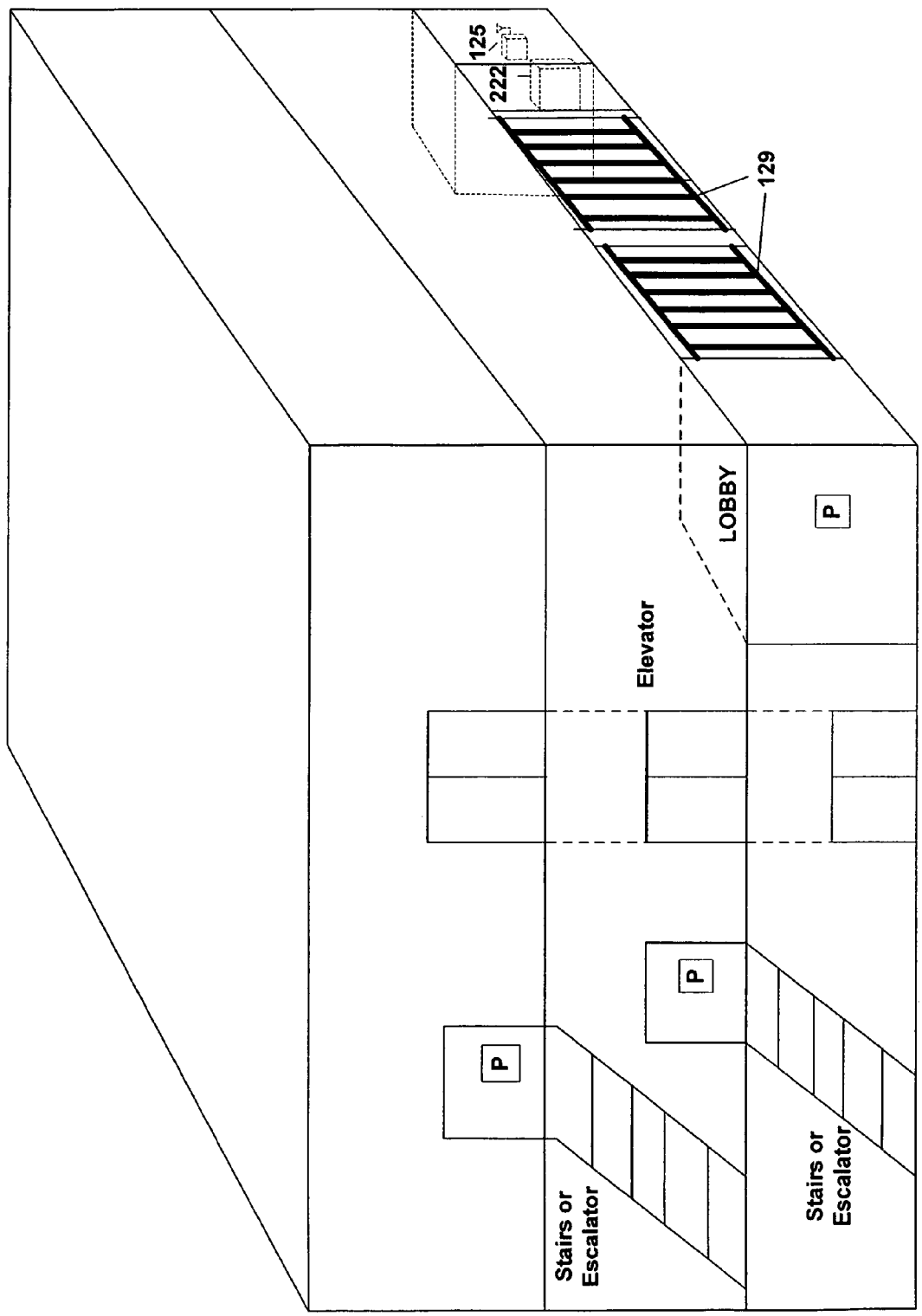
FIG. 5 is an isometric view of a home, facility or business having a plurality of floors, one of which is shown in FIG. 3, whose elevators, escalators and stairwells are controlled by the ASCS in addition to the portals, lighting, telephones, facsimile machines and personal computers.
Figure 6:
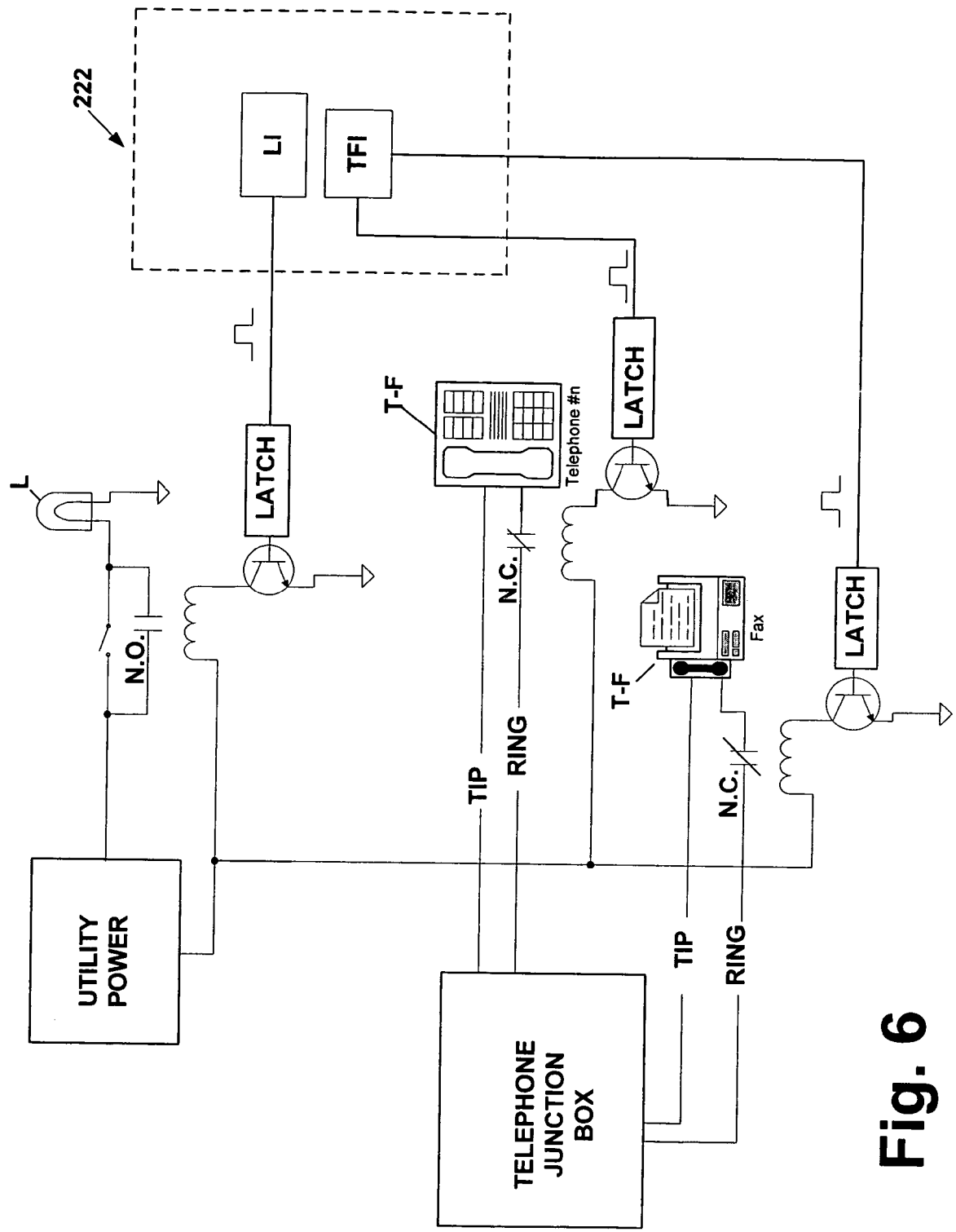
FIG. 6 are exemplary circuits used by the ASCS to control operation of lighting, telephones and facsimile machines.

FIG. 4 is a plan view of the floor of an exemplary facility that utilizes the present invention 120 whereby access to, or operation of, physical access devices P, lighting L, telephones or facsimile machines TF, personal computers PC are all controlled by the ASCS. FIG. 5 is an isometric view of that exemplary facility showing a plurality of floors, one of which is shown in FIG. 4, whose elevators, escalators and stairwells are controlled by the ASCS in addition to the physical access devices P, lighting L, telephones or facsimile machines TF and personal computers PC. FIG. 5 also shows the motorized bars 129 that are controlled by the ASCS when it is necessary to protect the windows of the facility at ground level. FIG. 6 provides exemplary circuits that can be used by the TF and LI to control the telephone/facsimile operation and lighting operation.

As in application Ser. No. 10/948,901, the ASCA is implemented as a stand-alone application that changes the ASCS configuration in accordance with the prevailing security situation (PSS) 122. Once a particular PSS 122 is provided to the ASCA, the ASCA uploads from memory the corresponding PSS 122 from the PA/EC matrix and implements the access command 8 which instructs the various interfaces (MCI, NI, TFI, TI etc.) to execute the authorized control.

As shown in FIG. 7A, and using an aerospace facility by way of example only, the portal access and equipment control conditions comprise a matrix that identifies which personnel (e.g., corporate, legal department, engineering, systems, structures, avionics, quality assurance, billing, maintenance, visitors, etc.) has access through particular portals, the use of specified telephones/facsimile machines, computers, networks, lighting, etc., for PSS#1. PSS#1 may represent a normal business day with no unusual environment conditions. However, should a PSS#10 be inputted to the ASCA, as shown in FIG. 7B, wherein PSS#10 represents an open house day at the aerospace facility, the ASCA would configure access to portals and devices such that only certain designated areas would be accessible by company personnel who may be attending with family and friends. In comparison, should a PSS#100 (FIG. 7C) be declared, which may represent an on-going theft, the ASCA would deny access to all exits, illuminate all lighting, etc.

It should be understood that the matrices shown in FIGS. 7A-7C are by way of example only and are only intended to demonstrate how the ASCA determines what portals and devices to control based on the particular PSS 122.

The following are other examples of the use of the present invention 120/220 in different environments:

EXAMPLE 1

Government

A government has reason to believe they are in a heightened state of defense because of an increased risk to a computer hacker. The ASCS 222 changes the state of the system 220 to increase security measures without preventing certain people from having access. For example, non-essential personnel will no longer has access to any PCs, and certain areas of the government agency facility will be secured by denying access through the physical devices P. The ASCS system 220 also directs security personnel to be present in certain locations, carry certain weapons or take certain security measures; by way of example only, the ASCS 222 alerts security personnel by activating the transmitter 125 which broadcasts an alert signal 127 to security personnel in and around the facility. The security system 220 could function in a particular work group, the entire agency, or the entire government at other locations.

EXAMPLE 2

Business

A business has reason to believe a confidential file has been taken from a filing cabinet. The ASCS 222 can lock all exits to the business so the perpetrator can be located and questioned—see FIG. 7C with regard to PSS: on-going theft.

A business could be hosting a party for a major client on its $10^{th}$ floor. The ASCS 222 can grant access to anyone entering the building, using elevators, washroom facilities during this time period. At the same time, to prevent theft from those offices on the $10^{th}$ floor, a mandate to security guards could be sent to guard the entrances to those offices. Additionally, lights L could be turned on in those offices to increase security.

EXAMPLE 3

Home

A person could set security settings to a minimum while he/she is with their family on a Sunday afternoon. This minimum setting could allow any person to enter any room in the house, use all telephones TF, PCs, and have access to all storage locations. Alternatively, during a party, the same person hosting a party in the house may have strangers in the house. The owner can adjust the security setting to lockout anyone not in his/her family to any room other than the rooms that he/she is using to host the party, while restricting use of telephones TF and any PCs to his/her family and certain guests.

EXAMPLE 4

Combining the Systems

In this example, a local news station broadcasts that a riot has formed and a mob is damaging buildings and properties. The government could issue a state of emergency (a high setting) to restrict access to all portals to the building, reinforce windows with metal shutters, request personnel to return all vehicles to the garage, and post guards at all entrances. The government might make this state of emergency known to businesses and individuals either electronically or by other means (television report, radio, etc.). Those businesses could have their security systems 220 automatically increase security settings to match the government settings or issue a caution to the ASCS 220 that the government has done so. The same option could be given to the individual. In the automatic approach, the security systems 220 could be linked by the Internet 44, for example. The business security system 220 could automatically monitor a particular website for the statement of security of the government. When the government changes its state of security, the security system 220 of the government would change its displayed security level. The business security system 220 could note the change and adapt its settings to match the governments. The web page method is construed to a non-limiting example of communication. Alternatively, an e-mail could be sent from a business to the home security systems 220 of its employees. The employee home security systems could then act on the content of that e-mail.

Thus, the present invention relates to a unique method 120 and system 220 for allowing an access controller (e.g., the person in charge of security) to manually or automatically change the access to locations or equipment based on the PSS 122. The unique system can be employed to protect the individual residence, a business or a government agency. Additionally, combinations of these parties are envisioned.

As mentioned earlier, with regard to the personnel 4, access rights can be attributed to individuals or a group of individuals, by way of example only. As shown in FIG. 8A, the method 120 and system 220 of the present invention may be configured such that access rights of personnel are defined based on the PSS 122, either in terms of the individual, or in terms of the groups of individuals (e.g., departments in a business such as a flight controls department in an aerospace company, see FIG. 8B) or a combination of both. As shown in FIG. 8C, the access rights, in turn, may be defined in terms of access right levels to portals P, telephones/facsimile machines, PCs.

EXAMPLE 5

The Individual Profile Approach

In this approach (FIG. 8A), a given PSS 122 contains a listing of privileges and times for a group of people. Additionally, certain features such as building lighting, security personnel presence, and building integrity may be automatically changed with each PSS 122. By inputting a particular PSS 122, the rights of the persons in the group would be changed, as would certain security settings around the facility. So for each PSS 122, there would be a separate list of security rights for each person (e.g., employee X) and certain required changes to the security of the building. The advantage of this approach is it allows a customized security setting for each person in a group for each security setting. The disadvantage would be the cost in setting up this profile and maintaining a set of profile for each and every employee.

EXAMPLE 6

Group Profile Approach

For users of this system where the individual profile approach (FIG. 8B) is too time consuming or expensive to maintain, a group profile approach can be used. In this method, each person has a list of privileges and times he can assert those privileges. This is known as the persons security profile. The security profiles for each person can be globally modified by a security level modifier. In this approach, each person is a member of a specific group, e.g., directors, contractors, cleaning staff, food staff, visitors, etc. Each group has a certain security profile. When the security level is modified, the system 220 would change the rights for the group, i.e., in high settings, cleaning staff might be denied access to the building, while directors are not denied access. This system is simpler to establish than the individual approach because deciding which employee has what access and at what time would not be necessary.

As mentioned earlier, it is within the broadest scope of the present invention to also include modifying the level of access of computers 38 based on the PSS 122. For example, all computers 38 in a building or facility that are networked and have network accounts (e.g., Microsoft domain model network) can have access to each computer regulated based on the PSS 122. Thus, as the PSS 122 increases in risk, those personnel (employees, cardholders, groups, etc.) having the proper security clearances are the only personnel having access to the network and even the computer station 38 itself. For example, should a user attempt to boot up a computer and the password entered is not part of the PSS 12 matrix criteria for the currently selected PSS 122, then access to that computer is denied to that particular user.

As used throughout this Specification, the term "biometric" includes any technology that identifies or verifies individuals based upon an individual's unique physical or behavioral characteristics. Devices employing these technologies match patterns of live individuals in real time against pre-stored records. Examples of biometric technologies are, but are not limited to, those that recognize and authenticate faces, hands, fingers, signatures, irises, voices, fingerprints, etc.

While the invention has been described in detail and with reference to specific examples thereof, it will be apparent to one skilled in the art that various changes and modifications can be made therein without departing from the spirit and scope thereof.

What is claimed is:

1. A method for adjusting access in an access control system for a building or facility or a residence, having portals and equipment, based on prevailing security situations, said method comprising the steps of:

associating personnel and time criteria with portals and equipment for a plurality of prevailing security situations to form a portal access and equipment control matrix;

storing said portal access and equipment control matrix in a database of an access control system computer;

coupling said access control system computer to portal controls and equipment controls;

selecting one of said prevailing security situations from said portal access and equipment control matrix; and automatically adjusting portal controls and equipment controls for said selected prevailing security situation.

2. The method of claim 1 wherein said step of associating personnel criteria with portals and equipment comprises defining groups of individuals.

3. The method of claim 1 wherein said step of associating personnel criteria with portals and equipment comprises identifying individuals.

4. The method of claim 2 wherein said step of associating personnel criteria with portals and equipment comprises identifying which groups of individuals need access to doors or equipment.

5. The method of claim 3 wherein said step of associating personnel criteria with portals and equipment comprises identifying which individuals need access to doors or equipment.

6. The method of claim 1 wherein said step of associating personnel criteria with portals and equipment comprises defining access level rights for every individual and associating each of said access level rights with portals and equipment.

7. The method of claim 1 wherein said step of associating personnel criteria with portals and equipment comprises defining access level rights for groups of individuals and associating each of said access level rights with portals and equipment.

8. The method of claim 1 wherein said prevailing security situations includes security situations defined by a government-issued threat level.

9. The method of claim 6 wherein said government-issued threat level comprises any one of the Homeland Security Levels.

10. The method of claim 1 wherein said prevailing security situations includes security situations where individuals or property may be in danger or involved in illegal activity.

11. The method of claim 1 wherein said prevailing security situations includes security situations where visitors may be present.

12. The method of claim 1 wherein said prevailing security situations includes holidays or weekends.

13. The method of claim 1 wherein said step of automatically adjusting portal controls comprises denying access or granting access through a portal by activating or de-activating a lock that controls the portal based on identification data provided to said access control system computer via identifying means located at the portal.

14. The method of claim 1 wherein said step of automatically adjusting portal controls and equipment controls comprises denying or permitting equipment operation.

15. The method of claim 14 wherein said step of denying or permitting equipment operation comprises de-activating or activating telephone or facsimile operation.

16. The method of claim 14 wherein said step of denying or permitting equipment operation comprises de-activating or activating lighting.

17. The method of claim 14 wherein step of denying or permitting equipment operation comprises broadcasting an alert to security personnel via cellular telephones.

18. The method of claim 13 wherein step of denying or permitting equipment operation comprises denying or granting access to computer networks.

19. The method of claim 18 wherein said denying or permitting equipment operation comprises denying or granting access to computer files.

20. A system for controlling access to a building or facility having portals that are opened or closed by locks, and equipment in the building or facility, using identity data detected by identity information detection means based on a plurality of prevailing security situations, said system comprising an access system control computer interfaced with the identity information detection means and with locks on the portals and with the equipment and wherein access through the portals or operation of the equipment is modified by said access system control computer based on a portal access and equipment control matrix that associates personnel, time and location criteria with said prevailing security situations.

21. The system of claim 20 wherein said portal access and equipment control matrix further associates personnel, time, location criteria and equipment criteria with prevailing security situations.

22. The system of claim 21 further comprising a main controller coupled to said access system control computer for multiplexing and processing data from said identity information detection means.

23. The system of claim 22 further comprising a terminal controller coupled to said main controller, said terminal controller implementing the control of the locks.

24. The system of claim 20 wherein said personnel criteria comprises individual identification.

25. The system of claim 20 wherein said personnel criteria comprises identification of groups of individuals.

26. The system of claim 20 wherein said personnel criteria comprises defining access level rights that are assigned to individuals and wherein said access level rights are associated with portals and equipment.

27. The system of claim 20 wherein said personnel criteria comprises defining access level rights that are assigned to groups of individuals and wherein said access level rights are associated with portals and equipment.

28. The system of claim 20 wherein said prevailing security situations includes security situations defined by a government-issued threat level.

29. The system of claim 28 wherein said government-issued threat level comprises any one of the Homeland Security Levels.

30. The system of claim 29 wherein said prevailing security situations includes security situations where individuals or property may be in danger or involved in illegal activity.

31. The system of claim 20 wherein said prevailing security situations includes security situations where visitors may be present.

32. The system of claim 20 wherein said prevailing security situations includes holidays or weekends.

33. The system of claim 20 wherein said access system control computer is coupled to a computer network for controlling access to said computer network based on said prevailing security situation.

34. The system of claim 20 wherein said access system control computer is coupled to the lighting in at least one facility and controls the operation of the lighting based on said prevailing security situation.

35. The system of claim 20 wherein said access system control computer is coupled to every telephone or facsimile machine in at least one facility and controls the operation of each telephone or facsimile machine based on said prevailing security situation.

36. The system of claim 20 wherein said access system control computer is coupled to a transmitter, said transmitter being activated to broadcast an alert to cellular telephones of security personnel based on said prevailing security situation.

37. The system of claim 20 wherein said identity information detection means comprises a card reader.

38. The system of claim 20 wherein said identity information detection means comprises a biometric device.

39. The system of claim 38 wherein said biometric device comprises a fingerprint reader.

40. The system of claim 38 wherein said biometric device comprises an eye-scan device.

41. The system of claim 38 wherein said biometric device comprises a voice recognition device.

* * * * *